April 24, 1928.  1,667,166

F. L. ORR

VARIABLE SPEED TRANSMISSION

Filed Nov. 29, 1924  2 Sheets-Sheet 1

INVENTOR.
F. L. Orr
BY
ATTORNEY.

April 24, 1928.

F. L. ORR 1,667,166

VARIABLE SPEED TRANSMISSION

Filed Nov. 29, 1924   2 Sheets-Sheet 2

INVENTOR.
F. L. ORR.

BY
ATTORNEY.

Patented Apr. 24, 1928.

1,667,166

UNITED STATES PATENT OFFICE.

FRANCIS L. ORR, OF DENVER, COLORADO.

VARIABLE-SPEED TRANSMISSION.

Application filed November 29, 1924. Serial No. 752,978.

This invention relates to variable speed transmission and its primary object is to provide a system of mechanical devices co-operatively assembled to transmit the movement of a driving element rotating at a constant angular velocity, to a driven element at a speed which is variable to any desired degree within predetermined limits, through a manually controlled adjustment.
Another object of the invention resides in incorporating in a transmission mechanism of the above described character, a differential gearing for the transmission of the movement of the driving element to the driven element at a reduced velocity; a further object is to effect the speed-variations by a controlling influence upon the operation of said gearing, and still another object is to provide in a mechanism as above described, means for controlling the relative speed of the driven element through the medium of frictionally engaging transmission-members.

With the above and other objects in view as will fully appear in the course of the following description, my invention consists in the construction, arrangement and combinations of parts illustrated in the accompanying drawings.

The illustration represents a preferred embodiment of the invention and it is to be understood that variations in details of construction may be resorted to without departing from the scope of the invention as hereinafter to be described and defined in the hereunto appended claims.

Figure 1:
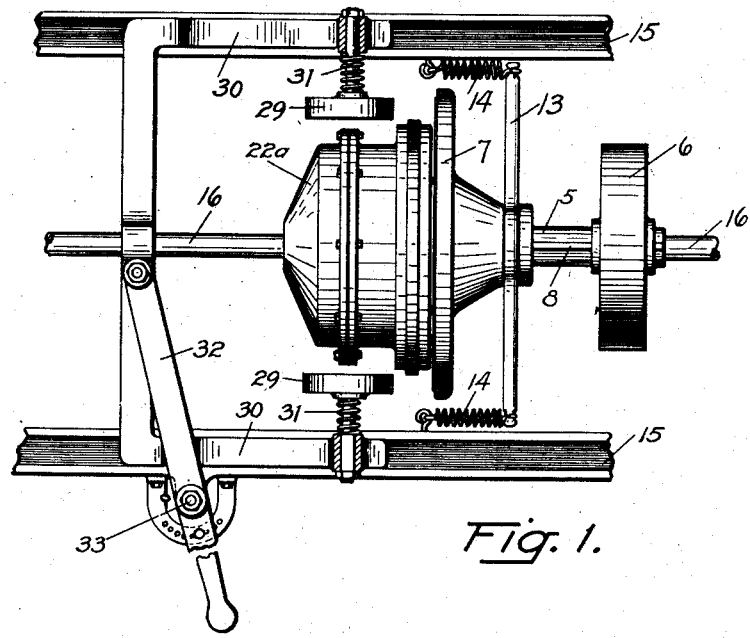
Figure 2:
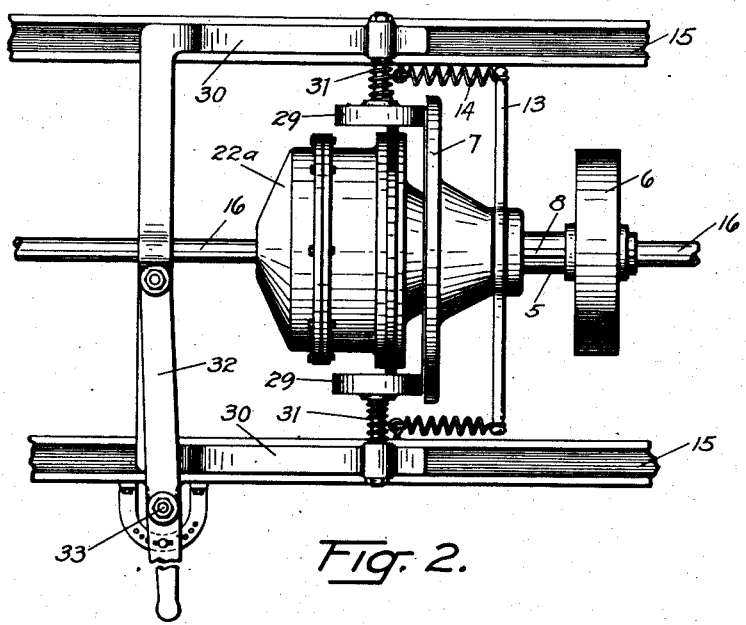
Figure 3:
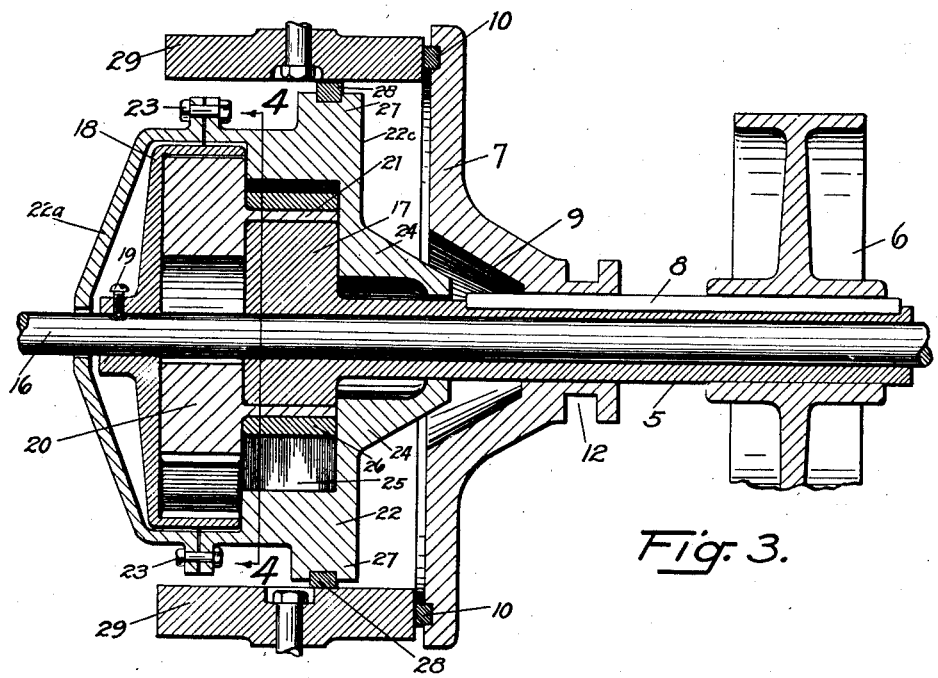
Figure 4:
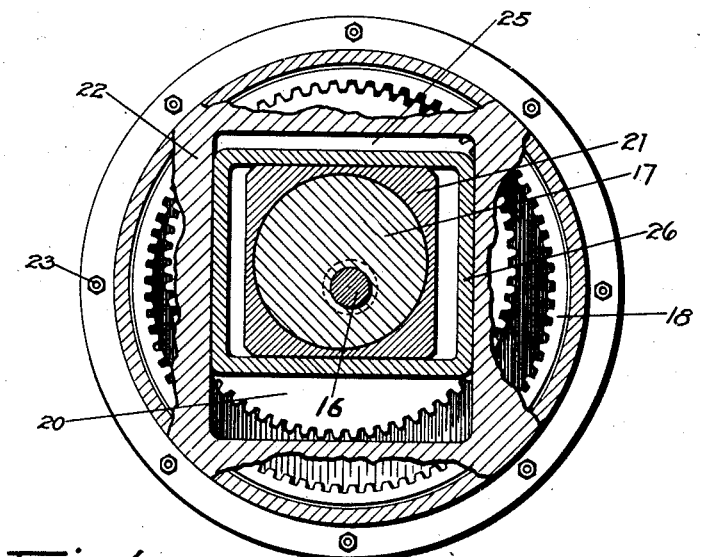

In the drawings in which like characters of reference designate corresponding parts throughout the several views, Figure 1 represents a plan view of the variable speed transmission in the condition in which the driven element thereof is in direct connection with the driving element to rotate therewith at an equal angular velocity;
Figure 2, a similar view with the parts positioned for the transmission of motion from the driving element to the driven element at a variable reduced velocity;

Figure 3, a fragmentary section in the horizontal axial plane of the transmission mechanism as illustrated in Figure 2, drawn to an enlarged scale;

Figure 4, a further enlarged transverse section taken in the plane indicated by the line 4—4 in Figure 3.

Referring to the drawings, 5 designates the driving shaft which in addition to a pulley 6 for its connection with a conveniently located source of energy, carries a combined clutch and transmission member 7.

The member 7 which is mounted to slide longitudinally of the shaft, by means of an extension of a key 8 which secures the pulley, consists of a disk on a hub which has a conical recess 9 to be frictionally engaged by a correspondingly formed male clutch member on the supporting housing of the differential gearing hereinafter to be described.

A ring 10 of rubber, leather, fiber or other friction-inducing material set in a concentric groove in the face of the disk is instrumental in transmitting the movement of the shaft to the variable speed-controlling element of the invention, and a circumferential groove 12 in the hub of the disk provides for its connection with the resilient means provided to insure the frictional contact of the member in its adjusted positions with either the speed controlling element or the clutch.

In the construction shown in the drawings, the resilient means above referred to, comprises a yoke 13 loosely resting in the groove of the hub, and a pair of coiled springs 14 which connect the ends of the yoke with the side bars 15 of a stationary frame forming part of the supporting structure of the machine to which the transmission is applied.

The driving shaft is hollow to admit in axially coincident relation thereto, a shaft 16 forming part of the driven element, and it has at one of its ends an eccentric circular head 17 for its operative connection with the differential gearing which as stated hereinbefore constitutes the medium through which the movement of the driving element is transmitted to the driven element at a reduced velocity.

The gearing comprises an annular internal gear wheel 18 which is fixed on the driven shaft by a set screw 19 or other suitable means, an external gear wheel 20 of smaller diameter meshing with the internal gear and provided with a hub 21 into which the eccentric head of the driving shaft is movably fitted, and a combined bearing and housing 22 which constitutes the element by which the speed-variations are controlled.

The bearing element which encloses the gearing is composed of two flanged sections 22ᵃ and 22ᵉ connected by bolts 23; it has in opposed relation to the conical recess of the friction disk, an outwardly projecting correspondingly formed hub 24 which constitutes the clutch member securing the rotative continuity of the housing with the driving shaft, and it is furthermore provided with an internal slideway 25 in which is contained a rectangular carrier frame 26 fitted to the hub 21 of the internal gear wheel 20.

The combined bearing element and housing is made so that it will retain a quantity of oil for lubrication of the differential gearing in the operation of the device.

The frame 26 has a rectilinear movement in the guideway of the element 22 and the hub of the external gear wheel is slidable in the frame in a direction at right angles to its said movement, thereby permitting of an eccentric movement of said gear wheel while the bearing element is held against rotation.

The element 22 has an externally formed circular rim 27 which is peripherally grooved for the application of a tire 28 to frictionally engage with the opposed faces of a pair of axially alined transmission-wheels 29 rotatably supported on a frame 30 which is slidably mounted in grooves of the before mentioned parallel members 15 of the supporting structure.

The wheels 29 are axially slidable in their bearings on the frame, and springs 31 coiled around their shafts, function to insure their frictional movement-transmitting contact with the tire on the bearing-element 22.

A lever 32 fulcrumed on the support as at 33 and pivotally connected with the sliding frame provides a convenient and ready means for manual adjustment of the wheels relative to the tire on the rim 27 and the friction ring 10 on the transmission disk 7, required in the operation of the mechanism as will now be described.

Premising that the driving shaft is rotated at a constant velocity by power transmitted to the pulley 6 from a motor or other source of mechanical energy, the friction member 7 moves in unison with the shaft while it is self-adjusting longitudinally thereof, and the eccentric 17 at the end of the shaft will impart a revolving motion to the external gear wheel 20 in the circle of the teeth of the internal gear wheel 18.

The movement-transmitting effect of this revolving motion upon the driven element is controlled by the bearing element on which the external gear is mounted for universal motion, it being evident that when the element is free to follow the movement of the external gear, the latter will rotate about its axis while revolving in its eccentric orbit, with the result that no motion is imparted to the internal gear, and that when the element is held against rotation, the revolving movement of the external gear will transmit a rotary motion to the internal gear in the same direction, proportionate to the ratio of the gears.

For example: If the internal gear has seventy-seven teeth, and the external gear has seventy teeth, giving a gear-ratio of eleven to one, the internal gear will travel a distance of seven teeth during each revolution of the internal gear, so that in a continuous operation, the driven element will make one revolution during each eleven revolutions of the driving element, if the bearing element is fixed against rotation.

When, instead of holding the bearing element against rotation, a rotary movement is imparted thereto in the direction of rotation of the eccentric but at a reduced velocity, the differential movement of the driven element is correspondingly increased so that by regulating the velocity of the bearing element, the speed of the driven element may be varied until the bearing element moves in unison with the driving element when the ratio of the velocities of the driving element and the driven element is one to one.

By rotating the bearing element in a direction opposite to that of the eccentric movement of the internal gear, at a gradually increasing velocity, the movement imparted to the driven element is correspondingly reduced until the velocity of the bearing element is in balance with the gear ratio when no motion is imparted to the driven element while further acceleration of the bearing element will cause the driven element to rotate in a direction reverse to that of the driving element at a proportionately increasing velocity.

It follows that if the transmission wheels 29 are separated from the face of the disk 7 by adjustment of the sliding frame 30 as illustrated in Figure 1, and the springs 14 have moved the disk to frictional contact with the clutch-cone 24 of the bearing element, the consequent rotation of the latter with the driving shaft at an equal velocity will cause the driven shaft to rotate in the same direction and at the same speed.

To differentiate the movement of the driven element relative to that of the driving element, the transmission wheels 29 are moved to simultaneously engage the tire 28 of the bearing-element and the friction ring 10 on the disk 7 as shown in Figure 2, thereby separating the disk from the clutch cone and imparting a rotary movement to the bearing element in the direction of that of the shaft.

The rotary movement of the bearing-element reduces the movement imparted to the driven element as hereinabove explained and by continuing the adjustment of the transmission wheels in the same direction, the angular velocity of the driven shaft may thus be proportionately reduced until the tire on the bearing-element engages in the center of the transmission wheels and is thereby held against rotation, when the velocity of the driven element proportionate to the constant velocity of the driving element equals the gearing ratio.

Further advance of the transmission wheels in the same direction, causes the bearing-element to rotate in a direction opposite to that of the driving shaft, thereby reducing the differential motion of the driven element until the movement of the controlling element 22 balances the gear-ratio, when further adjustment of the controlling-element will result in the rotary movement of the driven element in a direction opposite to that of the driving element.

It will thus be seen that in the operation of my invention, the movement of the driven element may be regulated to any desired velocity in ratio to the constant movement of the driving element and that by the same regulative action the movement of the driven element can be reversed.

Having thus described my invention, what I claim and desire to secure by Letters Patent is:

1. In variable speed transmission, the combination with a driving element and a driven element, of motion transmitting differential gearing including a rotary control element, an eccentric on the driving element, an internal gear wheel on the driven element and an external gear wheel, means for transmitting motion from the eccentric to the external gear wheel in the circle of the teeth of the internal gear wheel, a motion transmitting member rotating with the driving element, yieldable means for urging the motion transmitting member in one direction, said member and control element having cooperative means for their conjunctive rotation in a determinate position of the member, an adjustment including a rotatable member engaging the motion transmitting member and the controlling element to transmit motion to the latter at a selective speed ratio, and means controlled by said control element for controlling the rotation of the external gear.

2. In variable speed transmission, the combination with a driving element and a driven element, of motion transmitting differential gearing including a rotary control element, an eccentric on the driving element, an internal gear wheel on the driven element and an external gear wheel, means for transmitting motion from the eccentric to the external gear wheel in the circle of the teeth of the internal gear wheel, a spring-urged friction disk slidably interlocked with the driving element, a laterally adjustable friction wheel having a face engagement with the control element and a peripheral engagement with the friction disk, and means controlled by said control element for controlling the rotation of the external gear.

3. In variable speed-transmission, a driving shaft, and a driven shaft in axial alinement, an eccentric on the driving shaft, an internal gear wheel on the driven shaft, an external gear wheel related to the eccentric for movement in the circle of the teeth of the internal gear wheel, a rotary bearing-element for the external gear wheel consisting of a casing forming a housing for the eccentric, the internal gear wheel and the external gear wheel, and adjustable means to control the movement of the bearing element in selective ratio to the constant velocity of the driving element.

4. In variable speed-transmission, a driving shaft, and a driven shaft in axial alinement, an eccentric on the driving shaft, an internal gear wheel on the driven shaft, an external gear wheel related to the eccentric for movement in the circle of the teeth of the internal gear wheel, a rotary bearing-element for the external gear wheel enclosing both gear-wheels, and adjustable means to control the movement of the bearing element in selective ratio to the constant velocity of the driving element.

5. In variable speed-transmission, a hollow driving shaft, a driven shaft axially coincident therewith, an eccentric on the driving shaft, an internal gear wheel on the driven shaft, an external gear wheel related to the eccentric for movement in the circle of the teeth of the internal gear wheel, a rotary bearing-element for the external gear wheel consisting of a casing forming a housing for the eccentric, the internal gear wheel and the external gear wheel, and adjustable means to control the movement of the bearing element in selective ratio to the constant velocity of the driving element.

6. In variable speed transmission, a driving shaft, a driven shaft, an eccentric on the driving shaft, an internal gear wheel on the driven shaft, an external gear wheel mounted on the eccentric for movement in the circle of the teeth of the internal gear wheel, a rotary bearing element for the external gear wheel, a friction disk rotatable with the driving element, and a laterally adjustable friction wheel having a face at right angles to its axis of rotation for engagement with the bearing element and adapted to peripherally engage the friction disk.

7. In variable speed transmission, a driving shaft, a driven shaft, an eccentric on the driving shaft, an internal gear-wheel on the driven shaft, an external gear wheel mounted on the eccentric for movement in the circle of the teeth of the internal gear wheel, a rotary bearing element for the external gear wheel, a motion-transmitting member rotatable with the driving element in slidable relation thereto, said member and the bearing member having co-operative means for their conjunctive rotation in a determinate position of the member, and means to adjust the speed ratio of the bearing element to the driving element by motion transmitting engagement with the member.

8. In variable speed transmission, a driving shaft, a driven shaft, an eccentric on the driving shaft, an internal gear wheel mounted on the eccentric, an external gear wheel mounted on the eccentric for movement in the circle of the teeth of the internal gear wheel, a rotary bearing member for the external gear wheel, a spring-urged friction disk rotatable with the driving shaft in slidable relation thereto, the bearing member and the disk having co-operative clutch-means for their conjunctive rotation, and an adjustment comprising a pair of wheels provided with friction-faces at right angles to a common axis of rotation, for engagement with the bearing member, and adapted to frictionally engage the friction disk.

9. In variable speed-transmission, a driving shaft, a driven shaft, axially coincident therewith, an eccentric on the driving shaft, an internal gear wheel on the driven shaft, an external gear wheel related to the eccentric for movement in the circle of the teeth of the internal gear wheel, a bearing-member for the external gear-wheel, having a circumferential tire, a spring-urged disk rotatable with the driving-shaft in slidable relation thereto, and having a concentric friction ring, the member and the disk having co-operative clutch means for their conjunctive rotation, and an adjustment including a friction wheel adapted to simultaneously engage the tire on the bearing-member and the ring of the disk.

10. In variable speed transmission, a driving shaft, a driven shaft, an eccentric on the driving shaft, an internal gear wheel on the driven shaft, an external gear wheel mounted on the eccentric and moving in the circle of the teeth of the internal gear wheel, a rotary bearing element for the external gear wheel, a rotary shaft member rotatable with the driving element in slidable relation thereto, said member and the bearing member having approximately conical hub portions forming clutch members for their conjunctive rotation in the determinate position of the member, and means to adjust the speed ratio of the bearing element to the driving element by motion transmitting engagement with the said member.

11. In variable speed transmission, the combination with a driving element and a driven element, of motion transmitting differential gearing including an eccentric on the driving element, an internal gear wheel on the driven element, an external gear wheel, a rotary control element having a bearing for the external gear wheel, means for transmitting movement from the eccentric to the external gear wheel for moving the latter in the circle of the teeth of the internal gear wheel, and means for transmitting motion from the driving element to the controlling element and for controlling the rotation thereof, the control element consisting of a casing housing the said gear wheels, the eccentric and the means for transmitting movement from the eccentric to the external gear.

12. In variable speed transmission, the combination with a driving element and a driven element, of motion transmitting differential gearing including an eccentric on the driving element, an internal gear on the driven element, an external gear wheel, a rotary control element having a bearing for the external gear wheel, means for transmitting movement from the eccentric to the external gear wheel for moving the latter in the circle of the teeth of the internal gear wheel, means for moving the control element in unison with the driving element, and means for varying the control of the said driving element in direct relation to the constant velocity of the driving element, the said means consisting of a casing forming a housing for the said gears, and an adjustable rotary member engaging the said casing and the driving element, the eccentric and the means for transmitting movement from the eccentric to the external gear wheel.

13. In variable speed transmission, the combination with a driving element and a driven element, of motion transmitting differential gearing, including an eccentric on the driving element, an internal gear wheel on the driven element, an external gear wheel, a rotary control element having a bearing for the external gear wheel, means for transmitting movement from the eccentric to the external gear wheel and moving the latter in the circle of the eccentric teeth of the internal gear wheel, said control element consisting of a casing forming a housing for the gear wheels, the eccentric and the means for transmitting movement from the eccentric to the external gear wheel, a motion transmitting member rotating with the driving element, and an adjustment including a rotary member engaging the motion transmitting member and the controlling element to transmit motion to the latter at a selective speed ratio.

In testimony whereof I have affixed my signature.

FRANCIS L. ORR.